(12) United States Patent
Chen et al.

(10) Patent No.: US 11,595,921 B2
(45) Date of Patent: Feb. 28, 2023

(54) METHODS AND APPARATUS FOR QCL ASSUMPTIONS FOR CROSS CARRIER MULTIPLE DCI

(71) Applicant: QUALCOMM Incorporated, San Diego, CA (US)

(72) Inventors: Yitao Chen, San Diego, CA (US); Mostafa Khoshnevisan, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 62 days.

(21) Appl. No.: 17/230,478

(22) Filed: Apr. 14, 2021

(65) Prior Publication Data

US 2021/0368457 A1 Nov. 25, 2021

Related U.S. Application Data

(60) Provisional application No. 63/027,308, filed on May 19, 2020.

(51) Int. Cl.
| | |
|---|---|
| *H04W 56/00* | (2009.01) |
| *H04W 72/12* | (2009.01) |
| *H04W 72/04* | (2009.01) |
| *H04W 72/0453* | (2023.01) |
| *H04W 72/1273* | (2023.01) |

(52) U.S. Cl.
CPC ..... *H04W 56/001* (2013.01); *H04W 72/0453* (2013.01); *H04W 72/1273* (2013.01); *H04W 72/1289* (2013.01)

(58) Field of Classification Search
CPC .......... H04W 56/001; H04W 72/0453; H04W 72/1273; H04W 72/1289; H04W 72/04; H04W 72/02

(Continued)

(56) References Cited

U.S. PATENT DOCUMENTS

2020/0322109 A1* 10/2020 Yu .................. H04L 5/0053
2020/0351892 A1* 11/2020 Yi .................. H04W 80/02
(Continued)

FOREIGN PATENT DOCUMENTS

AU 2019476586 A1 * 6/2022

OTHER PUBLICATIONS

International Search Report and Written Opinion—PCT/US2021/027529—ISA/EPO—dated Aug. 3, 2021.

(Continued)

*Primary Examiner* — Candal Elpenord
(74) *Attorney, Agent, or Firm* — Procopio, Cory, Hargreaves & Savitch LLP

(57) ABSTRACT

The present disclosure relates to methods and devices for wireless communication including an apparatus, e.g., a UE and/or TRP. In one aspect, the apparatus can receive, on a first CC, first DCI from a first TRP and second DCI from a second TRP, the first DCI indicating one of a first set of TCI states and the second DCI indicating one of a second set of TCI states. The apparatus can also receive, on a second CC, a first PDSCH from the first TRP and a second PDSCH from the second TRP, a first time offset being between the first DCI and the first PDSCH and a second time offset being between the second DCI and the second PDSCH. The apparatus can also determine a QCL assumption based on at least one of the first time offset, the second time offset, and a QCL time duration.

30 Claims, 10 Drawing Sheets

(58) Field of Classification Search
USPC .......................................................... 370/350
See application file for complete search history.

(56) References Cited

U.S. PATENT DOCUMENTS

| | | | | |
|---|---|---|---|---|
| 2020/0351926 | A1* | 11/2020 | Bagheri | H04W 52/0229 |
| 2021/0014931 | A1* | 1/2021 | Noh | H04W 72/042 |
| 2021/0058113 | A1* | 2/2021 | Jung | H04B 7/0628 |
| 2022/0141857 | A1* | 5/2022 | Lee | H04W 72/1289 370/329 |

OTHER PUBLICATIONS

Lenovo et al., "Remaining Issues on Multi-TRP/Panel Transmission", 3GPP TSG RAN WG1 Meeting #100bis, R1-2001971, Apr. 10, 2020 (Apr. 10, 2020), XP051873389, 11 Pages, Retrieved from the internet: URL: https://ftp.3gpp.org/tsg_ran/WG1_RL1/TSGR1_100b_e/Docs/R1-2001971.zip. R1-2001971 Remaining issues on multi-TRP transmission_final.docx [retrieved on Apr. 10, 2020] sections 1-4, figure 1, chapter 2.4.

Samsung: "On Rel.16 Multi-TRP/Panel Transmission", 3GPP TSG RAN WG1#101-e, 3GPP Draft, R1-2003881, 3rd Generation Partnership Project (3GPP), Mobile Competence Centre, 650, Route Des Lucioles, F-06921 Sophia-Antipolis Cedex, France, vol. RAN WG1. No. e-Meeting, May 25, 2020-Jun. 5, 2020, May 15, 2020 (May 15, 2020), 14 Pages, XP051885647, Retrieved from the Internet: URL: https://ftp.3gpp.org/tsg_ran/WG1_RL1/TSGR1_101-e/Docs/R1-2003881.zip, R1-2003881 multT-TRP.docx [retrieved on May 15, 2020], the whole document.

* cited by examiner

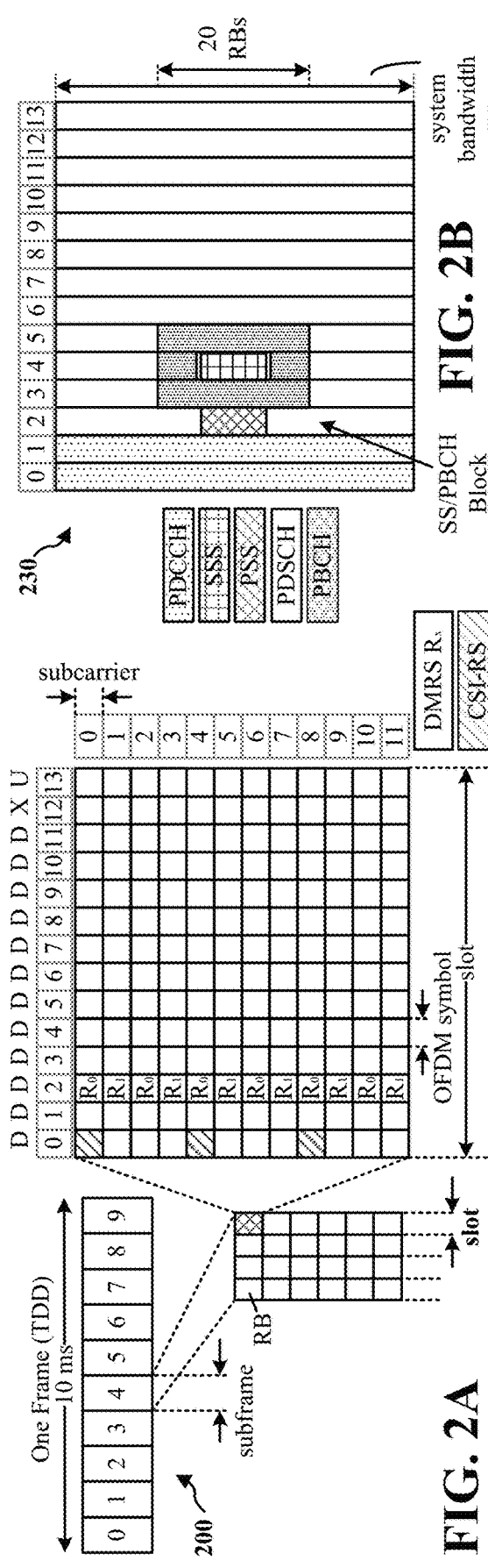
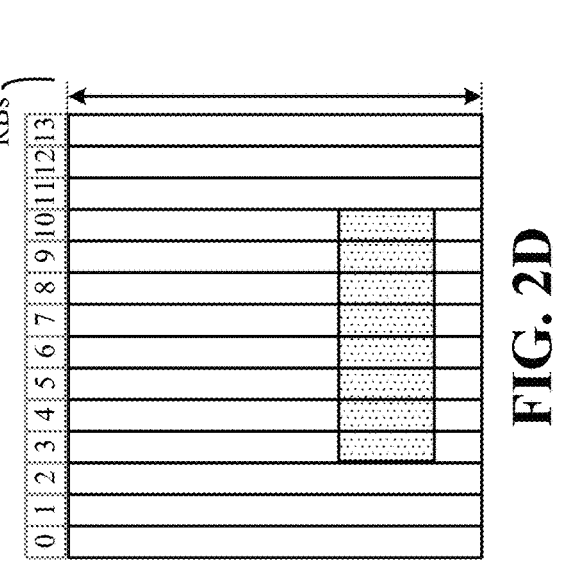
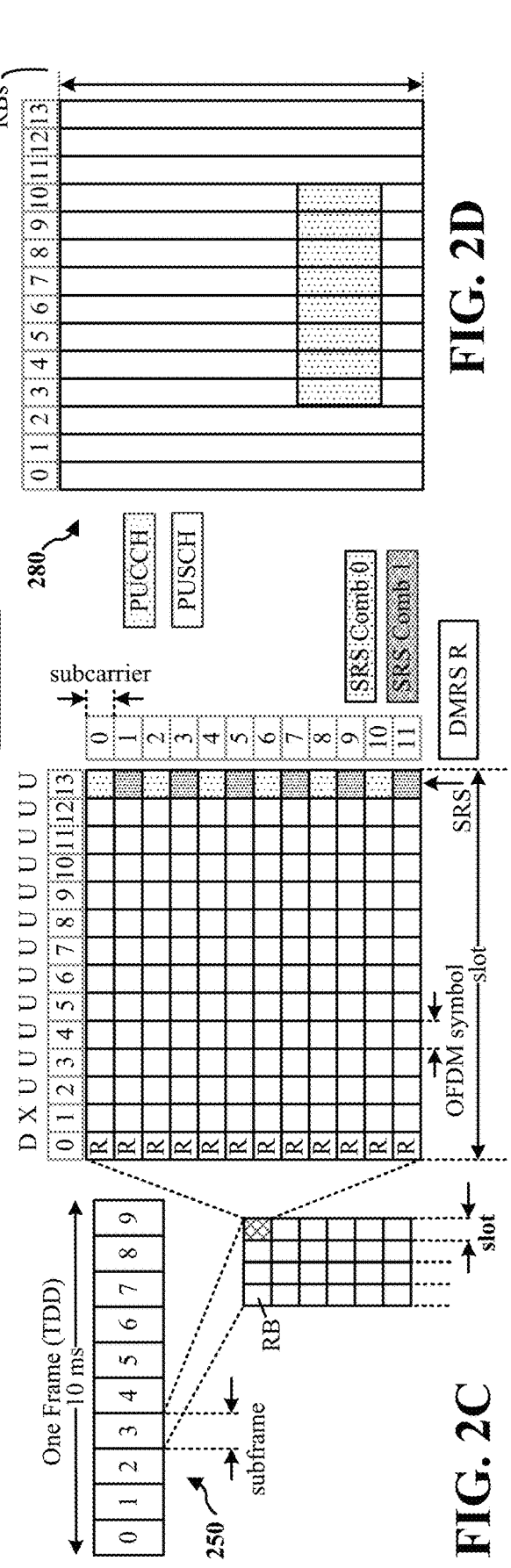
FIG. 2A  FIG. 2B  FIG. 2C  FIG. 2D

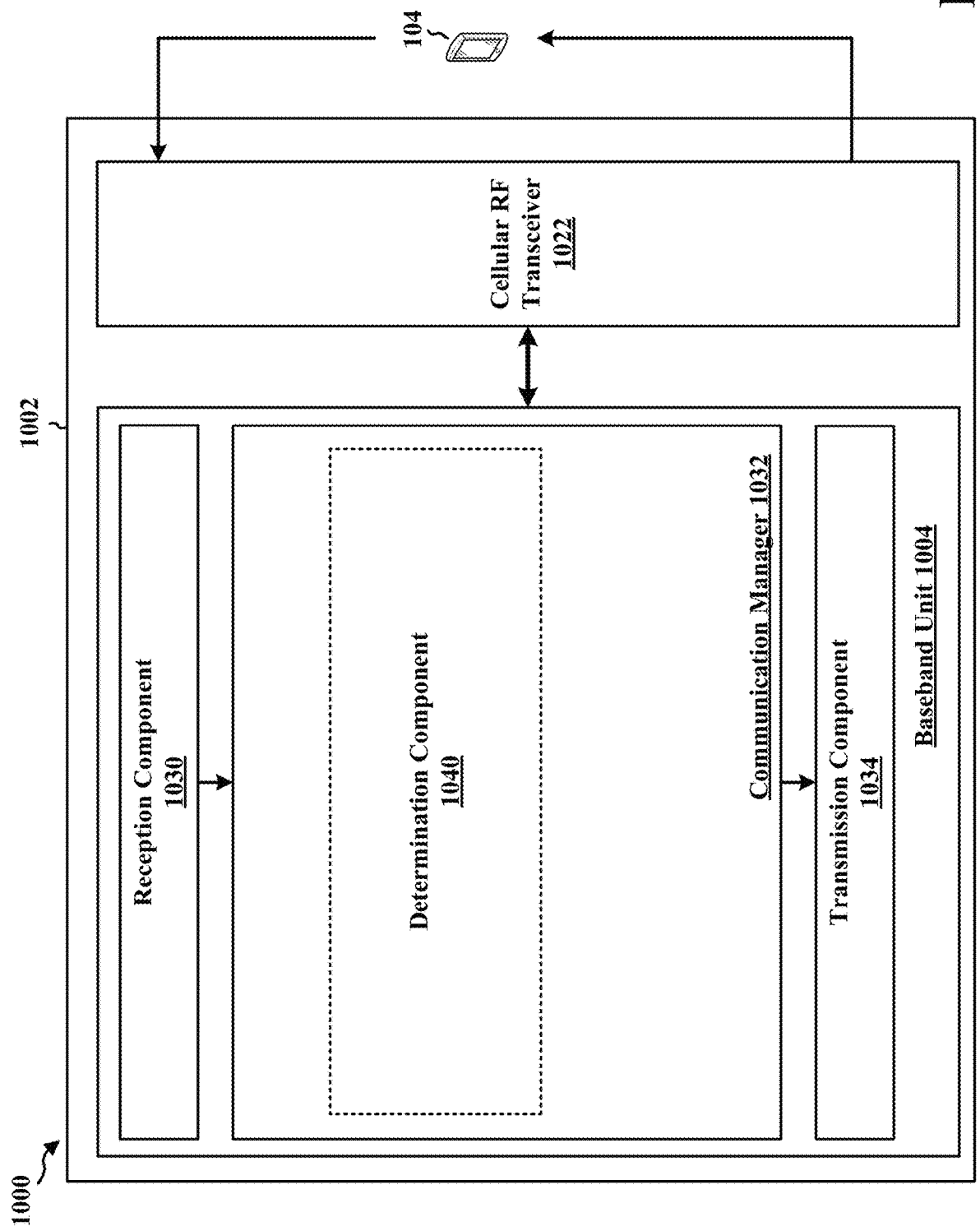

METHODS AND APPARATUS FOR QCL ASSUMPTIONS FOR CROSS CARRIER MULTIPLE DCI

CROSS REFERENCE TO RELATED APPLICATION(S)

This application claims the benefit of U.S. Provisional Application Ser. No. 63/027,308, entitled "METHODS AND APPARATUS FOR QCL ASSUMPTIONS FOR CROSS CARRIER MULTIPLE DCI" and filed on May 19, 2020, which is expressly incorporated by reference herein in its entirety.

BACKGROUND

Technical Field

The present disclosure relates generally to communication systems, and more particularly, to quasi co-location (QCL) assumptions in wireless communication systems.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may receive a first medium access control (MAC) control element (MAC-CE) indicating a first set of transmission configuration indication (TCI) states and a second MAC-CE indicating a second set of TCI states. The apparatus may also receive, on a first component carrier (CC), first downlink control information (DCI) from a first transmit-receive point (TRP) and second DCI from a second TRP, where the first DCI may indicate one of a first set of transmission configuration indication (TCI) states and the second DCI may indicate one of a second set of TCI states. Additionally, the apparatus may receive, on a second CC, a first physical downlink shared channel (PDSCH) from the first TRP and a second PDSCH from the second TRP, where a first time offset may be between the first DCI and the first PDSCH and a second time offset may be between the second DCI and the second PDSCH. The apparatus may also calculate the first time offset between the first DCI and the first PDSCH and the second time offset between the second DCI and the second PDSCH. Further, the apparatus may determine a quasi co-location (QCL) assumption based on at least one of the first time offset between the first DCI and the first PDSCH, the second time offset between the second DCI and the second PDSCH, and a QCL time duration. The apparatus may also apply the QCL assumption based on at least one of the first time offset between the first DCI and the first PDSCH, the second time offset between the second DCI and the second PDSCH, and the QCL time duration.

In another aspect of the disclosure, a method, a computer-readable medium, and an apparatus are provided. The apparatus may be a transmit-receive point (TRP) or a base station. The apparatus may transmit a first medium access control (MAC) control element (MAC-CE) indicating a first set of transmission configuration indication (TCI) states. The apparatus may also transmit, on a first component carrier (CC), first downlink control information (DCI) to a user equipment (UE), the first DCI indicating one of a first set of TCI states. The apparatus may also transmit, on a second CC, a first physical downlink shared channel (PDSCH) to the UE, a first time offset being between the first DCI and the first PDSCH.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 10 is a diagram illustrating an example of a hardware implementation for an example apparatus.

DETAILED DESCRIPTION

Figure 1:
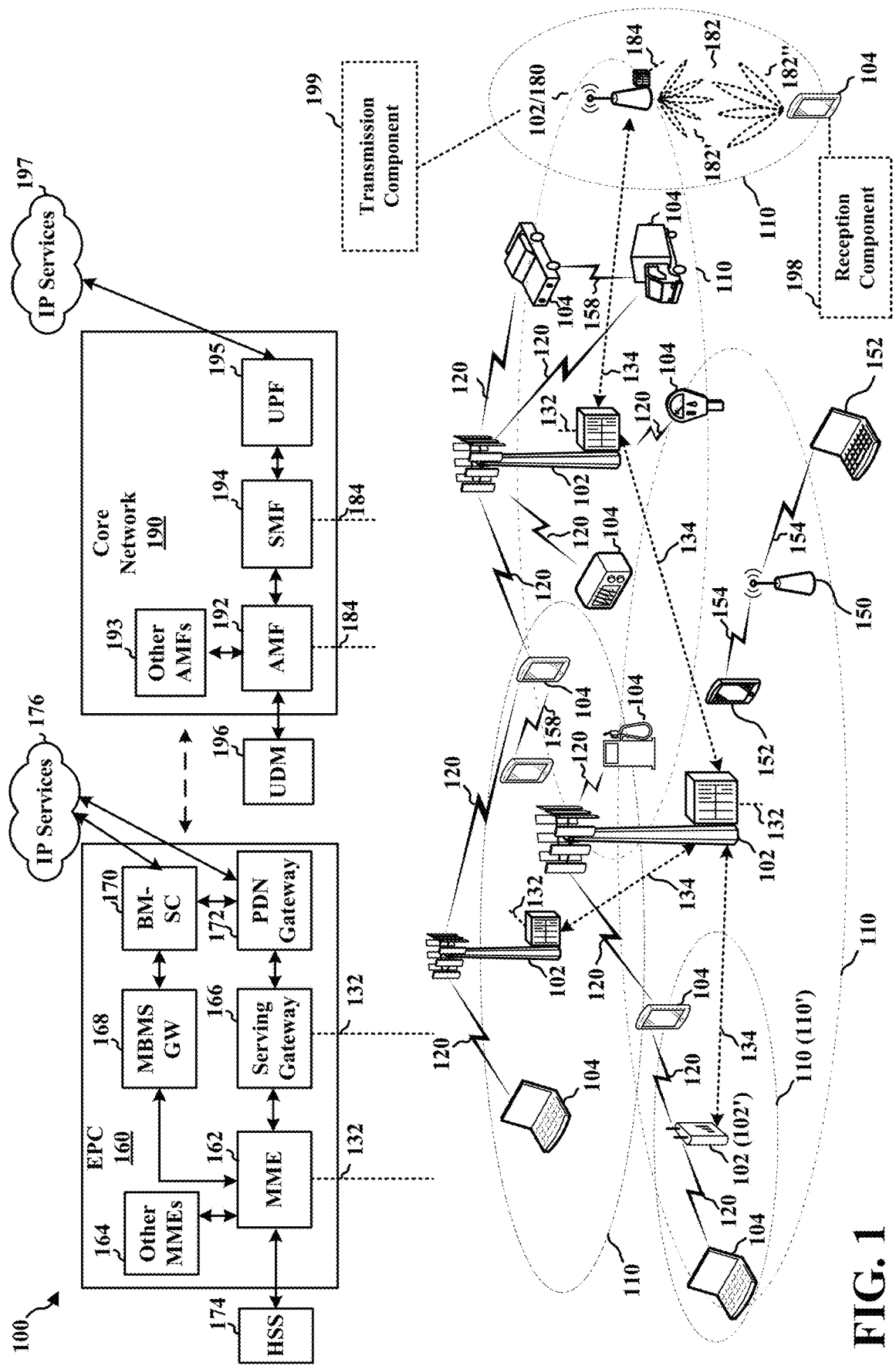
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure.

One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to YMHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a reception component 198 configured to receive a first medium access control (MAC) control element (MAC-CE) indicating a first set of transmission configuration indication (TCI) states and a second MAC-CE indicating a second set of TCI states. Reception component 198 may also be configured to receive, on a first component carrier (CC), first downlink control information (DCI) from a first transmit-receive point (TRP) and second DCI from a second TRP, where the first DCI may indicate one of a first set of transmission configuration indication (TCI) states and the second DCI may indicate one of a second set of TCI states. Reception component 198 may also be configured to receive, on a second CC, a first physical downlink shared channel (PDSCH) from the first TRP and a second PDSCH from the second TRP, where a first time offset may be between the first DCI and the first PDSCH and a second time offset may be between the second DCI and the second PDSCH. Reception component 198 may also be configured to calculate the first time offset between the first DCI and the first PDSCH and the second time offset between the second DCI and the second PDSCH. Reception component 198 may also be configured to determine a quasi co-location (QCL) assumption based on at least one of the first time offset between the first DCI and the first PDSCH, the second time offset between the second DCI and the second PDSCH, and a QCL time duration. Reception component 198 may also be configured to apply the QCL assumption based on at least one of the first time offset between the first DCI and the first PDSCH, the second time offset between the second DCI and the second PDSCH, and the QCL time duration.

Referring again to FIG. 1, in certain aspects, the base station 180 may include a transmission component 199 configured to transmit a first medium access control (MAC) control element (MAC-CE) indicating a first set of transmission configuration indication (TCI) states. Transmission component 199 may also be configured to transmit, on a first component carrier (CC), first downlink control information (DCI) to a user equipment (UE), the first DCI indicating one of a first set of TCI states. Transmission component 199 may also be configured to transmit, on a second CC, a first physical downlink shared channel (PDSCH) to the UE, a first time offset being between the first DCI and the first PDSCH.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
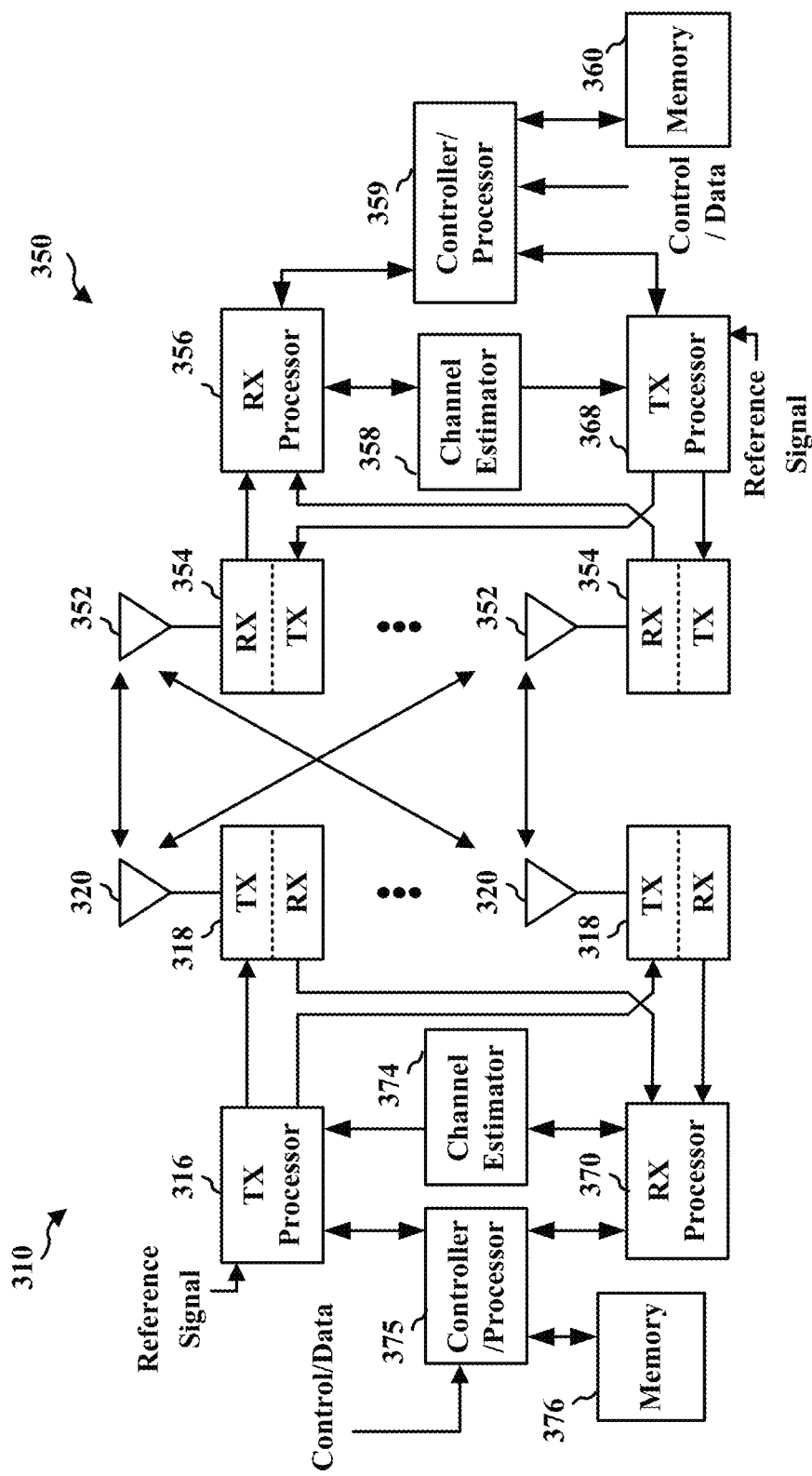
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate a radio frequency (RF) carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium which may store computer executable code for wireless communication of a user equipment (UE), the code when executed by a processor (e.g., one or more of RX processor 356, TX processor 368, and/or controller/processor 359) instructs the processor to perform aspects of FIGS. 9, 10, and/or 11. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium which may store computer executable code for wireless communication of base station, the code when executed by a processor (e.g., one or more of RX processor 370, TX processor 316, and/or controller/processor 375) instructs the processor to perform aspects of FIGS. 9, 10, and/or 11. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

In some aspects of wireless communications, a set of transmission configuration indication (TCI) states, e.g., up to eight (8) TCI states, can be activated for a PDSCH. These TCI states can be activated by a medium access control (MAC) control element (MAC-CE). Additionally, a TCI field in downlink control information (DCI) can indicate the TCI state for the scheduled PDSCH if the time offset between the reception of the downlink DCI and the corresponding PDSCH is greater than or equal to a defined threshold, e.g., a quasi co-location (QCL) time duration or timeDurationForQCL. Also, the QCL time duration can be based on a UE capability, e.g., 14 or 28 OFDM symbols.

In some instances, if the time offset between the downlink DCI and the corresponding PDSCH is less than the timeDurationForQCL, then a default QCL assumption may be utilized, e.g., for QCL-TypeD. This default QCL assumption can be based on the UE having some capability of decoding the DCI, which can be equal to the time offset between the downlink DCI and the PDSCH. So if the PDSCH is received before the UE can decode the DCI, then the UE may utilize a default QCL assumption to receive the PDSCH. As indicated herein, the DCI can be transmitted on or associated with a PDCCH.

Also, the default QCL assumption for a PDSCH can be a QCL or TCI state of the control resource set (CORESET) associated with a monitored search space with the lowest CORESET identifier (CORESET-ID) in the latest slot in which one or more CORESETs within the active bandwidth part of the serving cell are monitored by the UE. So when the time offset between the downlink DCI and the corresponding PDSCH is less than the timeDurationForQCL, the TCI state of the CORESET associated with a monitored search space with the lowest CORESET-ID can be utilized. A CORESET can be a resource allocation for the PDCCH, such that a frequency or time domain resource for a PDCCH can be defined based on the CORESET.

In some aspects, if all the TCI codepoints are mapped to a single TCI state and the offset between the reception of the downlink DCI and the corresponding PDSCH is less than the threshold timeDurationForQCL, the UE may assume that the DM-RS ports of a PDSCH of a serving cell are quasi co-located with the reference signal (RS) with respect to the QCL parameter used for a PDCCH quasi co-location indication of the CORESET associated with a monitored search space with the lowest controlResourceSetId in the latest slot in which one or more CORESETs within the active bandwidth part (BWP) of the serving cell are monitored by the UE.

Aspects of wireless communications can utilize a multiple DCI based design for multiple transmit-receive point (TRP) transmission, which is when one UE utilizes multiple TRPs or base stations for wireless transmissions. So a UE can receive multiple PDCCHs and PDSCHs from multiple TRPs or base stations. For example, first DCI transmitted from a first TRP can schedule a first PDSCH transmitted from the first TRP, and second DCI transmitted from a second TRP can schedule a second PDSCH transmitted from the second TRP. The TRP differentiation at the UE side can be based on a CORESET pool index value or CORESETPoolIndex. In some instances, each CORESET, e.g., up to five (5) CORESETs, can be configured with a CORESET pool index value or CORESETPoolIndex, e.g., a value of zero (0) or one (1). Also, the CORESETs can be grouped into two groups with a CORESETPoolIndex value of zero (0) or one (1). Beyond this, different TRPs may be transparent to the UE.

In some aspects, there can be a number of different conditions to determine if a UE is configured with multiple DCI based multiple TRP transmission. For instance, one condition can determine if a UE is configured by a higher layer parameter, e.g., PDCCH-Config, that contains two different values of CORESETPoolIndex in CORESETs for the active BWP of a serving cell. So a UE can determine a multiple DCI multiple TRP transmission by identifying two different CORESETPoolIndex values. Additionally, multiple DCI based multiple TRP transmission can be defined by given component carrier (CC) or serving cell. Also, some CCs may be configured with two CORESETPoolIndex values.

In addition, a MAC-CE can indicate a set of active TCI states, e.g., up to eight (8) TCI states, that are mapped to a set of TCI codepoints, e.g., eight (8) TCI codepoints. A MAC-CE can also indicate a CORESETPoolIndex value, e.g., zero (0) or one (1) bit, which is associated with a first TRP or a second TRP, respectively. The MAC-CE can also be received by the UE prior to the DCI via a higher layer signaling process. The set of active TCI states may be used when DCI is detected in a CORESET configured with the same CORESETPoolIndex value. Hence, interpretation of the TCI field of the DCI may depend on the CORESETPoolIndex value of the CORESET in which the DCI is detected. The TCI state indicated by the TCI codepoint in the DCI may be used when a scheduling offset is larger than the threshold timeDurationForQCL.

In some instances, two separate MAC-CEs can be sent for each PDSCH, e.g., one MAC-CE corresponding to a CORESETPoolIndex value of 0 and another MAC-CE corresponding to a CORESETPoolIndex value of 1. Also, each TCI codepoint may be mapped to one TCI state. For example, for a CORESETPoolIndex value of 0, each TCI codepoint, e.g., TCI codepoints 0-7, can be mapped to a TCI state ID, e.g., TCI state IDs 1-8. Also, for a CORESETPoolIndex value of 1, each TCI codepoint, e.g., TCI codepoints 0-7, can be mapped to a TCI state ID, e.g., TCI state IDs 2-9.

The CORESETPoolIndex value of the CORESET in which a DCI is received may be used for different purposes, such as HARQ-ACK codebook construction and transmission and/or PDSCH scrambling. The CORESETPoolIndex value may also be used for a default QCL assumption rule, e.g., a UE may maintain two default QCL assumptions corresponding to the TCI states of the CORESET with a lowest CORESET ID within each CORESETPoolIndex value. So there may be multiple QCL assumptions associated with multiple CORESETPoolIndex values.

Additionally, utilizing two default beams may be an optional feature which can depend on a UE capability. As such, based on multiple DCI transmissions with one default beam or two default beams, the UE may apply a certain condition or rule for a default QCL assumption.

Some aspects of wireless communications can also utilize cross-carrier scheduling, which is when a PDCCH on one cell or CC, i.e., a scheduling cell or CC, is used to send DCI in order to schedule a PDSCH or PUSCH on a different cell or CC, i.e., the scheduled cell or CC. So the DCI can be received on a certain CC and the PDSCH can be received on another CC. Also, a carrier indicator field (CIF) in the DCI can be used to indicate the scheduled CC. For example, a number of bits in the CIF can be zero (0) or three (3) bits. If zero (0) bits are configured, this may correspond to self-scheduling. So a value of zero for a CIF may mean the scheduling DCI is on the same CC, i.e., self-scheduling.

In some instances, two different scheduling cells may not schedule the same scheduled cell. If a UE monitors PDCCH candidates on a cell, then it may do at least self-scheduling.

Also, some aspects of wireless communications can utilize a cross-carrier default beam for a single TRP. In these instances, if the PDCCH carrying the scheduling DCI is received on one component carrier, and the PDSCH scheduled by that DCI is on another component carrier, then a default QCL assumption may be assumed. For instance, the default QCL assumption can be the activated TCI state with the lowest ID used for the PDSCH in the active bandwidth part (BWP) of the scheduled cell.

Figure 4:
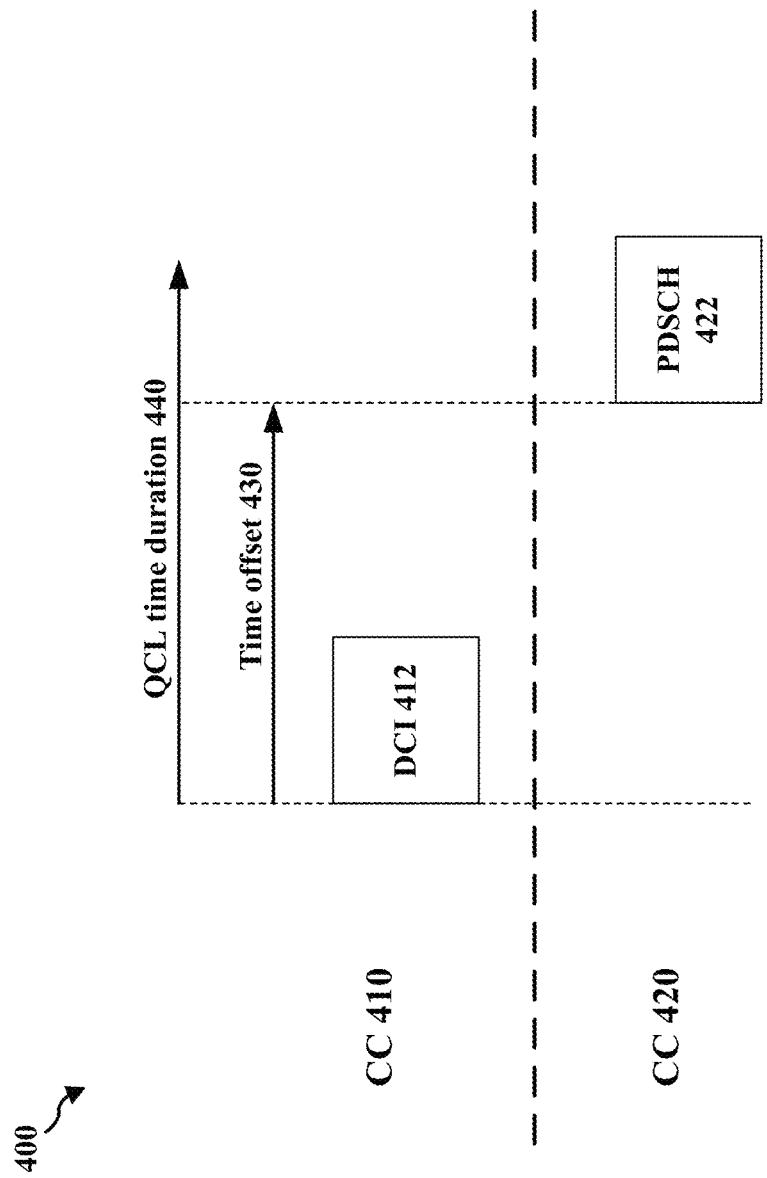
FIG. 4 is a diagram illustrating an example QCL assumption configuration in accordance with one or more techniques of the present disclosure.

FIG. 4 is a diagram 400 illustrating an example QCL assumption configuration in accordance with one or more techniques of the present disclosure. As shown in FIG. 4, diagram 400 includes multiple component carriers (CCs). For instance, diagram 400 includes a first CC, e.g., CC 410, and a second CC, e.g., CC 420. Diagram 400 also includes DCI, e.g., DCI 412, and a PDSCH, e.g., PDSCH 422. Further, diagram 400 includes a time offset between the DCI 412 and PDSCH 422, e.g., time offset 430, and QCL time duration or timeDurationforQCL 440.

As shown in FIG. 4, the time offset 430 between the DCI 412 and the PDSCH 422 can be equal to the difference between the receive time of the DCI 412 and the receive time of the PDSCH 422. This time offset 430 can be compared with the QCL time duration 440, which can be a fixed value for a UE. FIG. 4 also shows that the DCI 412 may be received on one CC, e.g., CC 410, and the PDSCH 422 may be received on another CC, e.g., CC 420. Also, CC 420 may be scheduled by CC 410, so it may not use a TCI state in DCI 412 for receiving a PDSCH. As further displayed in FIG. 4, time offset 430 is less than QCL time duration 440. So the UE may identify the TCI state with the lowest TCI state ID and then utilize this TCI state for receiving the PDSCH 422.

For cases when a TCI value in the DCI, e.g., tci-PresentInDCI, is set to 'enabled' and the offset between the reception of the downlink DCI and the corresponding PDSCH is less than the threshold timeDurationForQCL and when tci-PresentInDCI is not configured, the UE may obtain a QCL assumption. For instance, the UE may obtain a QCL assumption for a scheduled PDSCH from the activated TCI state with the lowest ID applicable to the PDSCH in the active BWP of the scheduled cell.

Also, if the PDCCH carrying the scheduling DCI is received on one component carrier, and the PDSCH scheduled by that DCI is received on another component carrier, then if the subcarrier spacing of the scheduling DCI is less than that of the scheduled PDSCH, an additional timing delay d may be added to the timeDurationForQCL, e.g., when a DCI on a first CC in one frequency range (FR) schedules a PDSCH on a second CC in another FR. Also, the timeDurationForQCL may be determined based on the subcarrier spacing of the scheduled PDSCH. As such, if $\mu_{PDCCH}$ is less than $\mu_{PDSCH}$, an additional timing delay d may be added to the timeDurationForQCL. So an additional time delay d can be added to the timeDurationForQCL when multiple CCs are in different FRs.

Based on the above, it may be beneficial to determine the QCL assumptions for cross-carrier multiple DCI based multiple TRP transmission. For instance, it may be beneficial to determine a QCL assumption for multiple PDSCHs in one CC based on the received scheduling DCIs in another CC. As indicated herein, in multiple DCI, the DCIs can be associated with different CORESETPoolIndex values. Additionally, in some instances, there can be different time offsets between different DCIs and the corresponding PDSCHs.

Figure 5:
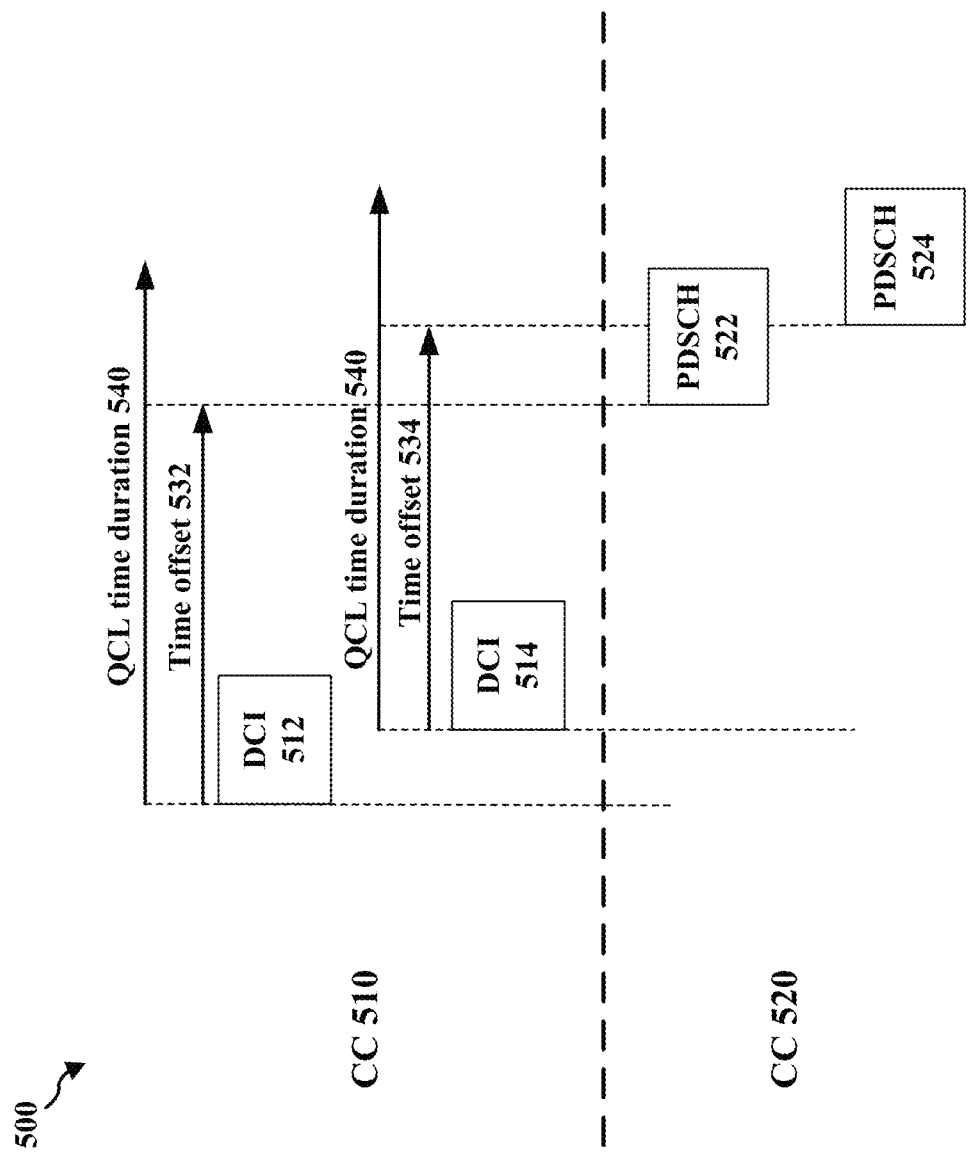
FIG. 5 is a diagram illustrating an example QCL assumption configuration in accordance with one or more techniques of the present disclosure.

FIG. 5 is a diagram 500 illustrating an example QCL assumption configuration in accordance with one or more techniques of the present disclosure. As shown in FIG. 5, diagram 500 includes multiple component carriers (CCs). For instance, diagram 500 includes a first CC, e.g., CC 510, and a second CC, e.g., CC 520. Diagram 500 also includes multiple DCIs, e.g., DCI 512 and DCI 514, and multiple PDSCHs, e.g., PDSCH 522 and PDSCH 524. Further, diagram 500 includes a time offset between the DCI 512 and PDSCH 522, e.g., time offset 532, and a time offset between the DCI 514 and PDSCH 524, e.g., time offset 534. Diagram 500 also includes a QCL time duration or timeDurationForQCL 540.

As shown in FIG. 5, the time offset 532 between the DCI 512 and the PDSCH 522 can be equal to the difference between the receive time of the DCI 512 and the receive time of the PDSCH 522. Also, the time offset 534 between the DCI 514 and the PDSCH 524 can be equal to the difference between the receive time of the DCI 514 and the receive time of the PDSCH 524. The time offset 532 and the time offset 534 can be compared with the QCL time duration 540, which can be a fixed value for a UE. FIG. 5 also shows that DCI 512 and DCI 514 may be received on one CC, e.g., CC 510, and PDSCH 522 and PDSCH 524 may be received on another CC, e.g., CC 520. Also, CC 520 may be scheduled by CC 510, so it may not use a QCL assumption for receiving a PDSCH. As further displayed in FIG. 5, time offset 532 and time offset 534 are less than QCL time duration 540. So the UE may identify the TCI state with the lowest TCI state ID and then utilize this TCI state for receiving PDSCH 522 and PDSCH 524.

In some aspects, DCI on a first CC may schedule a PDSCH on a second CC, where the second CC may be a multiple TRP CC, such that it is associated with two CORESETPoolIndex values. For instance, the two DCIs may be received on the first CC with two CORESETPoolIndex values, e.g., CORESETPoolIndex=0 and CORESETPoolIndex=1. Although the PDSCHs received on the second CC may not include CORESETPoolIndex values, they are associated with the corresponding DCIs that include CORESETPoolIndex values, so the PDSCHs are associated with the CORESETPoolIndex values. As such, some CCs, e.g., a second CC, may not include CORESETs.

Additionally, in some instances, a UE may receive two MAC-CEs for PDSCH active TCI states of a second CC. Moreover, each TCI codepoint can be mapped to one TCI state. For example, for a MAC-CE with CORESETPoolIndex=0, each of TCI codepoints 0-7 can be mapped to one of TCI state IDs 1-8. Also, for a MAC-CE with CORESETPoolIndex=1, each of TCI codepoints 0-7 can be mapped to one of TCI state IDs 2-9.

In some aspects, if a UE supports one default beam, then the activated TCI state with the lowest ID or lowest codepoint in a first MAC-CE associated with a first CORESETPoolIndex value, or in a second MAC-CE associated with a second CORESETPoolIndex value, may be used as the default QCL assumption for the PDSCH reception in the active BWP of the scheduled cell. So the TCI state with the lowest ID or codepoint from one MAC-CE list (e.g., out of two MAC-CE lists in cross-carrier multi-DCI) may be used to receive a PDSCH. A beam configuration may be applied for the first beam or the second beam when the UE supports one beam. Also, the activated TCI state with the lowest ID across both MAC-CEs may be used as the default QCL assumption for the PDSCH reception in the active BWP of the scheduled cell. So the TCI state with the lowest ID or codepoint from both MAC-CE lists in cross-carrier multi-DCI may be used to receive a PDSCH. If there is one default beam supported, and there is overlap when receiving the multiple PDSCHs, the UE may decide to drop one of the PDSCHs.

Additionally, if a UE supports two default beams to receive multiple PDSCHs when determining the QCL assumption, then for the first default beam, the activated TCI state with the lowest ID or lowest codepoint in a first MAC-CE list associated with a first value of CORESETPoolIndex may be used for the PDSCH in the active BWP of the scheduled cell. For the second default beam, the activated TCI state with the lowest ID or lowest codepoint in a second MAC-CE list associated with a second value of CORESETPoolIndex may be used for the PDSCH in the active BWP of the scheduled cell. So the beam configuration may be applied for the first beam and the second beam when the UE supports multiple beams. In one example, the UE may receive two sets of DCI on one CC, e.g., CC0, and may receive two PDSCHs on another CC, e.g., CC1, and based on the time offsets between the different sets of DCI and corresponding PDSCH, the UE may determine a QCL assumption. So the UE may determine which beam to use when receiving the PDSCHs. The UE may also determine a QCL assumption based on the time offsets of the DCI and corresponding PDSCH. Once the QCL assumption is determined, the UE may apply a beam configuration assumption.

Figure 6:
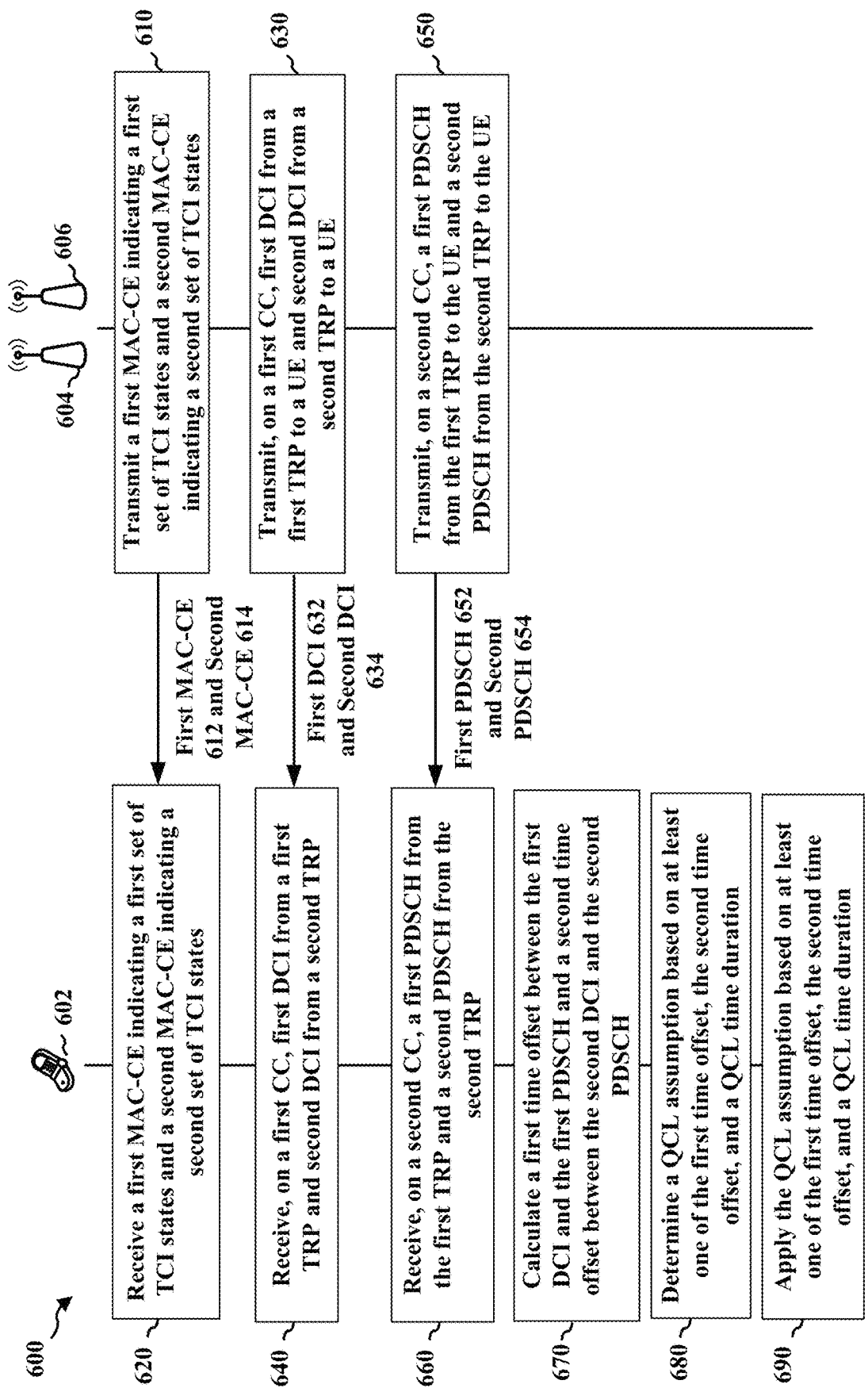
FIG. 6 is a diagram illustrating example communication between a UE and multiple TRPs in accordance with one or more techniques of the present disclosure.

FIG. 6 is a diagram 600 illustrating example communication between a UE 602, a first TRP or base station 604, and a second TRP or base station 606. At 610, first TRP 604 may transmit a first MAC-CE, e.g., first MAC-CE 612, indicating a first set of TCI states, and second TRP 606 may transmit a second MAC-CE, e.g., second MAC-CE 614, indicating a second set of TCI states. At 620, the UE 602 may receive a first MAC-CE, e.g., first MAC-CE 612, indicating a first set of TCI states and a second MAC-CE, e.g., second MAC-CE 614, indicating a second set of TCI states.

At 630, first TRP 604 may transmit, on a first CC, first DCI, e.g., first DCI 632, to UE 602, the first DCI indicating one of a first set of TCI states. The second TRP 606 may transmit, on a first CC, second DCI, e.g., second DCI 634, to UE 602, the second DCI indicating one of a second set of TCI states. At 640, the UE 602 may receive, on a first CC, first DCI, e.g., first DCI 632, from a first TRP, e.g., first TRP 604, and second DCI, e.g., second DCI 634, from a second TRP, e.g., second TRP 606, where the first DCI may indicate one of a first set of TCI states and the second DCI may indicate one of a second set of TCI states.

In some instances, the first DCI may schedule a first PDSCH on a second CC and the second DCI may schedule a second PDSCH on the second CC. Further, the first DCI may be associated with a first control resource set (CORESET) pool index value and the second DCI may be associated with a second CORESET pool index value.

At 650, the first TRP 604 may transmit, on a second CC, a first PDSCH, e.g., first PDSCH 652, to the UE 602, where a first time offset may be between the first DCI and the first PDSCH. The second TRP 606 may transmit, on a second CC, a second PDSCH, e.g., second PDSCH 654, to the UE 602, where a second time offset may be between the second DCI and the second PDSCH. At 660, the UE 602 may receive, on a second CC, a first PDSCH, e.g., first PDSCH 652, from the first TRP 604 and a second PDSCH, e.g., second PDSCH 654, from the second TRP 606, where a first time offset may be between the first DCI and the first PDSCH and a second time offset may be between the second DCI and the second PDSCH.

At 670, the UE 602 may calculate the first time offset between the first DCI 632 and the first PDSCH 652 and the second time offset between the second DCI 634 and the second PDSCH 654. The first time offset may be equal to a difference between a receive time of the first DCI 632 and a receive time of the first PDSCH 652, and the second time offset may be equal to a difference between a receive time of the second DCI 634 and a receive time of the second PDSCH 654.

At 680, the UE 602 may determine a QCL assumption based on at least one of the first time offset between the first DCI 632 and the first PDSCH 652, the second time offset between the second DCI 634 and the second PDSCH 654, and a QCL time duration. At 690, the UE 602 may apply the QCL assumption based on at least one of the first time offset between the first DCI 632 and the first PDSCH 652, the second time offset between the second DCI 634 and the second PDSCH 654, and the QCL time duration.

In some aspects, the QCL assumption may be equal to a default QCL assumption when the first time offset is less than the QCL time duration and the second time offset is less than the QCL time duration. Also, the default QCL assumption may correspond to a lowest TCI state of the first set of TCI states or the second set of TCI states. The default QCL assumption may also correspond to a lowest TCI state of the first set of TCI states and the second set of TCI states.

Additionally, the QCL assumption may correspond to the one of the first set of TCI states indicated by the first DCI 632 or the one of the second set of TCI states indicated by the second DCI 634 when the first time offset is greater than or equal to the QCL time duration or the second time offset is greater than or equal to the QCL time duration. In some instances, a TCI state for the first PDSCH 652 may correspond to the one of the first set of TCI states indicated by the first DCI 632 and a TCI state for the second PDSCH 654 may correspond to the one of the second set of TCI states indicated by the second DCI 634.

Figure 7:
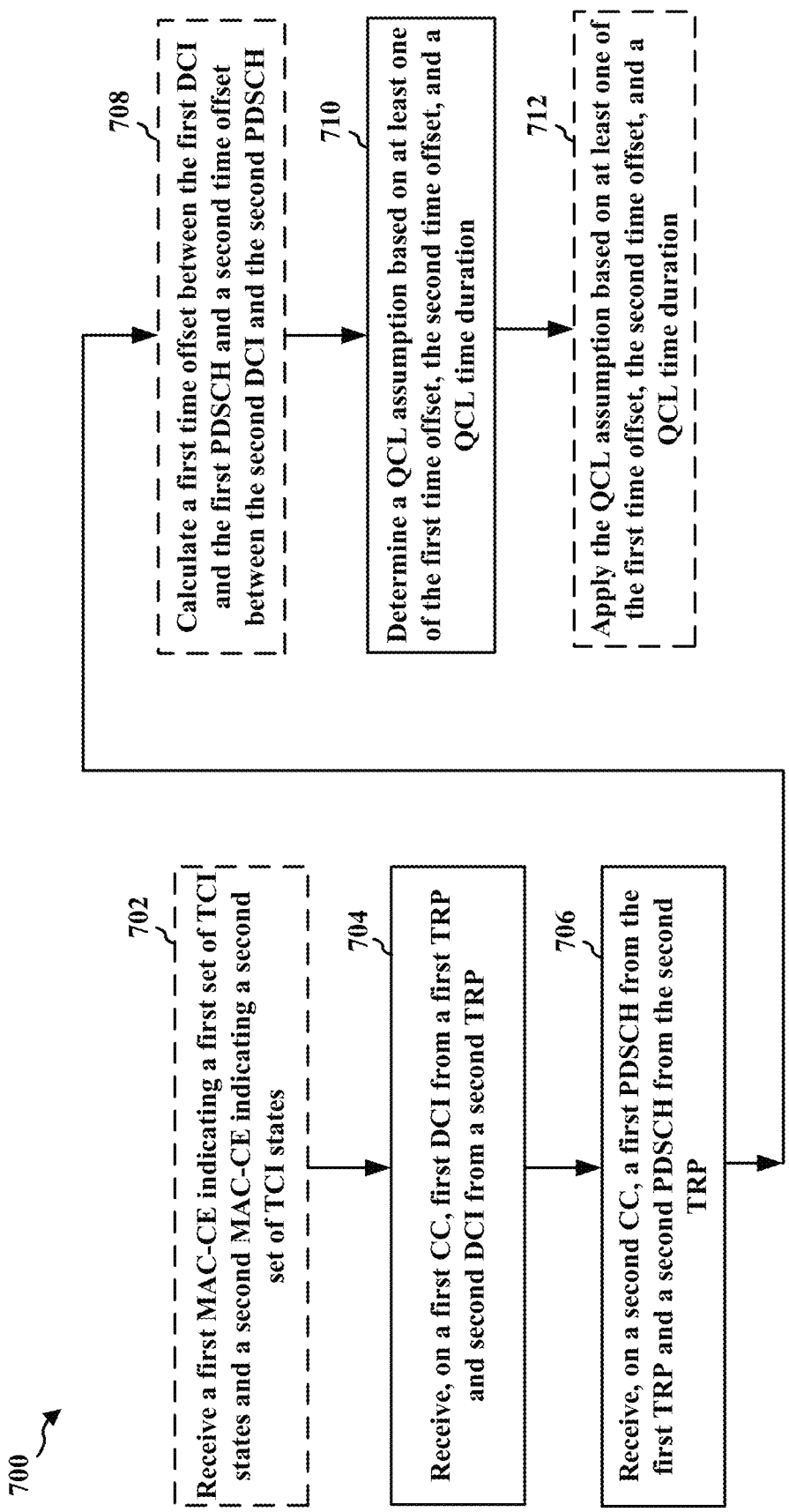
FIG. 7 is a flowchart of a method of wireless communication.

FIG. 7 is a flowchart 700 of a method of wireless communication. The method may be performed by a UE or a component of a UE (e.g., the UE 104, 350, 602; apparatus 902; a processing system, which may include the memory 360 and which may be the entire UE or a component of the UE, such as the TX processor 368, the controller/processor 359, transmitter 354TX, antenna(s) 352, and/or the like). Optional aspects are illustrated with a dashed line. The methods described herein can provide a number of benefits, such as improving communication signaling, resource utilization, and/or power savings.

At 702, the apparatus may receive a first MAC-CE indicating a first set of transmission configuration indication (TCI) states and a second MAC-CE indicating a second set of TCI states, as described in connection with the examples in FIGS. 4, 5, and 6. For example, UE 602 may receive a first MAC-CE indicating a first set of transmission configuration indication (TCI) states and a second MAC-CE indicating a second set of TCI states, as described in connection with 620 in FIG. 6. Further, 702 may be performed by determination component 940 in FIG. 9.

At 704, the apparatus may receive, on a first CC, first downlink control information (DCI) from a first TRP and second DCI from a second TRP, where the first DCI may indicate one of a first set of TCI states and the second DCI may indicate one of a second set of TCI states, as described in connection with the examples in FIGS. 4, 5, and 6. For example, UE 602 may receive, on a first CC, first downlink control information (DCI) from a first TRP and second DCI from a second TRP, where the first DCI may indicate one of a first set of TCI states and the second DCI may indicate one of a second set of TCI states, as described in connection with 640 in FIG. 6. Further, 704 may be performed by determination component 940 in FIG. 9. In some instances, the first DCI may schedule a first PDSCH on a second CC and the second DCI may schedule a second PDSCH on the second CC, as described in connection with the examples in FIGS. 4, 5, and 6. Further, the first DCI may be associated with a first control resource set (CORESET) pool index value and the second DCI may be associated with a second CORESET pool index value, as described in connection with the examples in FIGS. 4, 5, and 6.

At 706, the apparatus may receive, on a second CC, a first PDSCH from the first TRP and a second PDSCH from the second TRP, where a first time offset may be between the first DCI and the first PDSCH and a second time offset may be between the second DCI and the second PDSCH, as described in connection with the examples in FIGS. 4, 5, and 6. For example, UE 602 may receive, on a second CC, a first PDSCH from the first TRP and a second PDSCH from the second TRP, where a first time offset may be between the first DCI and the first PDSCH and a second time offset may be between the second DCI and the second PDSCH, as described in connection with 660 in FIG. 6. Further, 706 may be performed by determination component 940 in FIG. 9.

At 708, the apparatus may calculate the first time offset between the first DCI and the first PDSCH and the second time offset between the second DCI and the second PDSCH, as described in connection with the examples in FIGS. 4, 5, and 6. For example, UE 602 may calculate the first time offset between the first DCI and the first PDSCH and the second time offset between the second DCI and the second PDSCH, as described in connection with 670 in FIG. 6. Further, 708 may be performed by determination component 940 in FIG. 9. The first time offset may be equal to a difference between a receive time of the first DCI and a receive time of the first PDSCH, and the second time offset may be equal to a difference between a receive time of the second DCI and a receive time of the second PDSCH, as described in connection with the examples in FIGS. 4, 5, and 6.

At 710, the apparatus may determine a quasi co-location (QCL) assumption based on at least one of the first time offset between the first DCI and the first PDSCH, the second time offset between the second DCI and the second PDSCH, and a QCL time duration, as described in connection with the examples in FIGS. 4, 5, and 6. For example, UE 602 may determine a quasi co-location (QCL) assumption based on at least one of the first time offset between the first DCI and the first PDSCH, the second time offset between the second DCI and the second PDSCH, and a QCL time duration, as described in connection with 680 in FIG. 6. Further, 710 may be performed by determination component 940 in FIG. 9.

At 712, the apparatus may apply the QCL assumption based on at least one of the first time offset between the first DCI and the first PDSCH, the second time offset between the second DCI and the second PDSCH, and the QCL time duration, as described in connection with the examples in FIGS. 4, 5, and 6. For example, UE 602 may apply the QCL assumption based on at least one of the first time offset between the first DCI and the first PDSCH, the second time offset between the second DCI and the second PDSCH, and the QCL time duration, as described in connection with 690 in FIG. 6. Further, 712 may be performed by determination component 940 in FIG. 9. In some aspects, the QCL assumption may be equal to a default QCL assumption when the first time offset is less than the QCL time duration and the second time offset is less than the QCL time duration, as described in connection with the examples in FIGS. 4, 5, and 6. Also, the default QCL assumption may correspond to a lowest TCI state of the first set of TCI states or the second set of TCI states, as described in connection with the examples in FIGS. 4, 5, and 6. The default QCL assumption may also correspond to a lowest TCI state of the first set of TCI states and the second set of TCI states, as described in connection with the examples in FIGS. 4, 5, and 6.

Additionally, the QCL assumption may correspond to the one of the first set of TCI states indicated by the first DCI or the one of the second set of TCI states indicated by the second DCI when the first time offset is greater than or equal to the QCL time duration or the second time offset is greater than or equal to the QCL time duration, as described in connection with the examples in FIGS. 4, 5, and 6. In some instances, a TCI state for the first PDSCH may correspond to the one of the first set of TCI states indicated by the first DCI and a TCI state for the second PDSCH may correspond to the one of the second set of TCI states indicated by the second DCI, as described in connection with the examples in FIGS. 4, 5, and 6.

Figure 8:
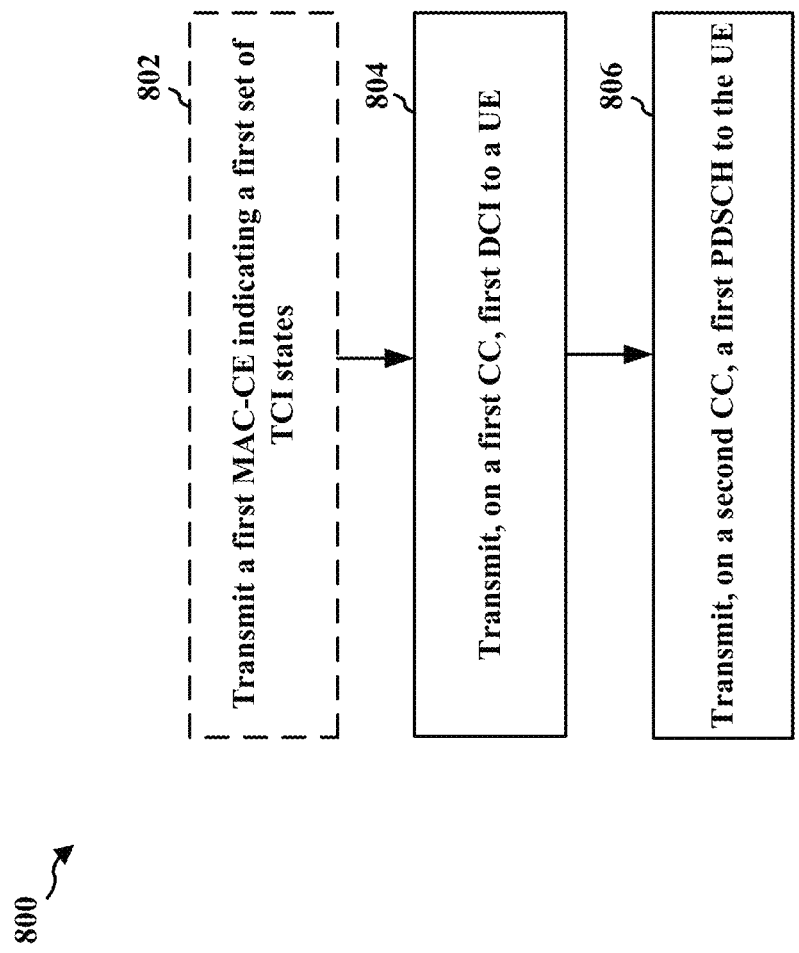
FIG. 8 is a flowchart of a method of wireless communication.

FIG. 8 is a flowchart 800 of a method of wireless communication. The method may be performed by a TRP or a base station, or a component of a TRP or base station (e.g., the base station 102, 180, 310, 604, 606; apparatus 1002; a processing system, which may include the memory 376 and which may be the entire base station or a component of the base station, such as the antenna(s) 320, receiver 318RX, the RX processor 370, the controller/processor 375, and/or the like). Optional aspects are illustrated with a dashed line. The methods described herein can provide a number of benefits, such as improving communication signaling, resource utilization, and/or power savings.

At 802, the apparatus may transmit a first MAC-CE indicating a first set of transmission configuration indication (TCI) states, as described in connection with the examples in FIGS. 4, 5, and 6. For example, first TRP 604 and/or second TRP 606 may transmit a first MAC-CE indicating a first set of transmission configuration indication (TCI) states, as described in connection with 610 in FIG. 6. Further, 802 may be performed by determination component 1040 in FIG. 10.

At 804, the apparatus may transmit, on a first component carrier (CC), first downlink control information (DCI) to a UE, the first DCI indicating one of a first set of TCI states, as described in connection with the examples in FIGS. 4, 5, and 6. For example, first TRP 604 and/or second TRP 606 may transmit, on a first component carrier (CC), first downlink control information (DCI) to a UE, the first DCI indicating one of a first set of TCI states, as described in connection with 630 in FIG. 6. Further, 804 may be performed by determination component 1040 in FIG. 10. In some instances, the first DCI may schedule a first PDSCH on a second CC. Further, the first DCI may be associated with a first control resource set (CORESET) pool index value, as described in connection with the examples in FIGS. 4, 5, and 6.

At 806, the apparatus may transmit, on a second CC, a first PDSCH to the UE, where a first time offset may be between the first DCI and the first PDSCH, as described in connection with the examples in FIGS. 4, 5, and 6. For example, first TRP 604 and/or second TRP 606 may transmit, on a second CC, a first PDSCH to the UE, where a first time offset may be between the first DCI and the first PDSCH, as described in connection with 650 in FIG. 6. Further, 806 may be performed by determination component 1040 in FIG. 10. The first time offset may be equal to a difference between a receive time of the first DCI and a receive time of the first PDSCH, as described in connection with the examples in FIGS. 4, 5, and 6.

In some aspects, a quasi co-location (QCL) assumption may be based on at least one of the first time offset between the first DCI and the first PDSCH and a QCL time duration, as described in connection with the examples in FIGS. 4, 5, and 6. In some aspects, the QCL assumption may be equal to a default QCL assumption when the first time offset is less than the QCL time duration, as described in connection with the examples in FIGS. 4, 5, and 6. Also, the default QCL assumption may correspond to a lowest TCI state of the first set of TCI states, as described in connection with the examples in FIGS. 4, 5, and 6.

Additionally, the QCL assumption may correspond to the one of the first set of TCI states indicated by the first DCI when the first time offset is greater than or equal to the QCL time duration, as described in connection with the examples in FIGS. 4, 5, and 6. In some instances, a TCI state for the first PDSCH may correspond to the one of the first set of TCI states indicated by the first DCI, as described in connection with the examples in FIGS. 4, 5, and 6.

Figure 9:
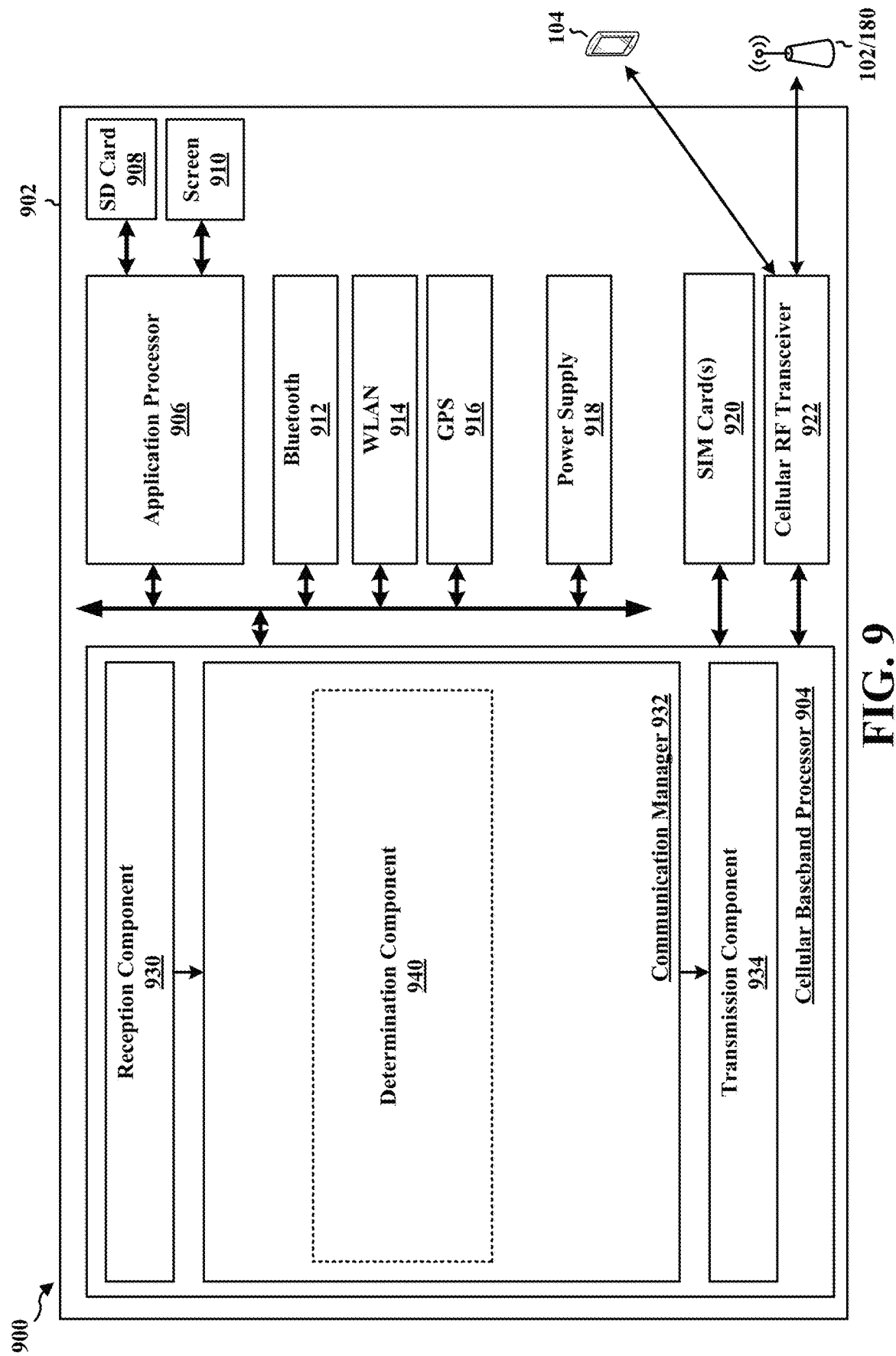
FIG. 9 is a diagram illustrating an example of a hardware implementation for an example apparatus.

FIG. 9 is a diagram 900 illustrating an example of a hardware implementation for an apparatus 902. The apparatus 902 is a UE and includes a cellular baseband processor 904 (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The cellular baseband processor 904 communicates through the cellular RF transceiver 922 with the UE 104 and/or BS 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the aforediscussed additional modules of the apparatus 902.

The communication manager 932 includes a determination component 940 that is configured to receive a first medium access control (MAC) control element (MAC-CE) indicating the first set of TCI states and a second MAC-CE indicating the second set of TCI states, e.g., as described in connection with step 702 in FIG. 7. Determination component 940 may be further configured to receive, on a first component carrier (CC), first downlink control information (DCI) from a first transmit-receive point (TRP) and second DCI from a second TRP, the first DCI indicating one of a first set of transmission configuration indication (TCI) states and the second DCI indicating one of a second set of TCI states, e.g., as described in connection with step 704 in FIG. 7. Determination component 940 may be further configured to receive, on a second CC, a first physical downlink shared channel (PDSCH) from the first TRP and a second PDSCH from the second TRP, a first time offset being between the first DCI and the first PDSCH and a second time offset being between the second DCI and the second PDSCH, e.g., as described in connection with step 706 in FIG. 7. Determination component 940 may be further configured to calculate the first time offset between the first DCI and the first PDSCH and the second time offset between the second DCI and the second PDSCH, e.g., as described in connection with step 708 in FIG. 7. Determination component 940 may be further configured to determine a quasi co-location (QCL) assumption based on at least one of the first time offset between the first DCI and the first PDSCH, the second time offset between the second DCI and the second PDSCH, and a QCL time duration, e.g., as described in connection with step 710 in FIG. 7. Determination component 940 may be further configured to apply the QCL assumption based on at least one of the first time offset between the first DCI and the first PDSCH, the second time offset between the second DCI and the second PDSCH, and the QCL time duration, e.g., as described in connection with step 712 in FIG. 7.

The apparatus may include additional components that perform each of the blocks of the algorithm in the aforementioned flowcharts of FIGS. 6 and 7. As such, each block in the aforementioned flowcharts of FIGS. 6 and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the cellular baseband processor 904, includes means for receiving a first medium access control (MAC) control element (MAC-CE) indicating the first set of TCI states and a second MAC-CE indicating the second set of TCI states; means for receiving, on a first component carrier (CC), first downlink control information (DCI) from a first transmit-receive point (TRP) and second DCI from a second TRP, the first DCI indicating one of a first set of transmission configuration indication (TCI) states and the second DCI indicating one of a second set of TCI states; means for receiving, on a second CC, a first physical downlink shared channel (PDSCH) from the first TRP and a second PDSCH from the second TRP, a first time offset being between the first DCI and the first PDSCH and a second time offset being between the second DCI and the second PDSCH; means for calculating the first time offset between the first DCI and the first PDSCH and the second time offset between the second DCI and the second PDSCH; means for determining a quasi co-location (QCL) assumption based on at least one of the first time offset between the first DCI and the first PDSCH, the second time offset between the second DCI and the second PDSCH, and a QCL time duration; and means for applying the QCL assumption based on at least one of the first time offset between the first DCI and the first PDSCH, the second time offset between the second DCI and the second PDSCH, and the QCL time duration. The aforementioned means may be one or more of the aforementioned components of the apparatus 902 configured to perform the functions recited by the aforementioned means. As described supra, the apparatus 902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

FIG. 10 is a diagram 1000 illustrating an example of a hardware implementation for an apparatus 1002. The apparatus 1002 is a base station (BS) or TRP and includes a baseband unit 1004. The baseband unit 1004 may communicate through a cellular RF transceiver 1022 with the UE 104. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the BS 310 and may include the memory 376 and/or at least one of the TX processor 316, the RX processor 370, and the controller/processor 375.

The communication manager 1032 includes a determination component 1040 that is configured to transmit a first medium access control (MAC) control element (MAC-CE) indicating the first set of TCI states, e.g., as described in connection with step 802 in FIG. 8. Determination component 1040 may be further configured to transmit, on a first component carrier (CC), first downlink control information (DCI) to a user equipment (UE), the first DCI indicating one of a first set of transmission configuration indication (TCI) states, e.g., as described in connection with step 804 in FIG. 8. Determination component 1040 may be further configured to transmit, on a second CC, a first physical downlink shared channel (PDSCH) to the UE, a first time offset being between the first DCI and the first PDSCH, e.g., as described in connection with step 806 in FIG. 8.

The apparatus may include additional components that perform each of the blocks of the algorithm in the aforementioned flowcharts of FIGS. 6 and 8. As such, each block in the aforementioned flowcharts of FIGS. 6 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the baseband unit 1004, includes means for transmitting a first medium access control (MAC) control element (MAC-CE) indicating the first set of TCI states; means for transmitting, on a first component carrier (CC), first downlink control information (DCI) to a user equipment (UE), the first DCI indicating one of a first set of transmission configuration indication (TCI) states; and means for transmitting, on a second CC, a first physical downlink shared channel (PDSCH) to the UE, a first time offset being between the first DCI and the first PDSCH. The aforementioned means may be one or more of the aforementioned components of the apparatus 1002 configured to perform the functions recited by the aforementioned means. As described supra, the apparatus 1002 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a user equipment (UE). The method includes receiving, on a first component carrier (CC), first downlink control information (DCI) from a first transmit-receive point (TRP) and second DCI from a second TRP, the first DCI indicating one of a first set of transmission configuration indication (TCI) states and the second DCI indicating one of a second set of TCI states; receiving, on a second CC, a first physical downlink shared channel (PDSCH) from the first TRP and a second PDSCH from the second TRP, a first time offset being between the first DCI and the first PDSCH and a second time offset being between the second DCI and the second PDSCH; and determining a quasi co-location (QCL) assumption based on at least one of the first time offset between the first DCI and the first PDSCH, the second time offset between the second DCI and the second PDSCH, and a QCL time duration.

Aspect 2 is the method of aspect 1, where the QCL assumption is equal to a default QCL assumption when the first time offset is less than the QCL time duration and the second time offset is less than the QCL time duration.

Aspect 3 is the method of any of aspects 1 and 2, where the default QCL assumption corresponds to a lowest TCI state of the first set of TCI states or the second set of TCI states.

Aspect 4 is the method of any of aspects 1 to 3, where the default QCL assumption corresponds to a lowest TCI state of the first set of TCI states and the second set of TCI states.

Aspect 5 is the method of any of aspects 1 to 4, where the QCL assumption corresponds to the one of the first set of TCI states indicated by the first DCI or the one of the second set of TCI states indicated by the second DCI when the first time offset is greater than or equal to the QCL time duration or the second time offset is greater than or equal to the QCL time duration.

Aspect 6 is the method of any of aspects 1 to 5, where a TCI state for the first PDSCH corresponds to the one of the first set of TCI states indicated by the first DCI and a TCI state for the second PDSCH corresponds to the one of the second set of TCI states indicated by the second DCI.

Aspect 7 is the method of any of aspects 1 to 6, further including calculating the first time offset between the first DCI and the first PDSCH and the second time offset between the second DCI and the second PDSCH.

Aspect 8 is the method of any of aspects 1 to 7, where the first time offset is equal to a difference between a receive time of the first DCI and a receive time of the first PDSCH, where the second time offset is equal to a difference between a receive time of the second DCI and a receive time of the second PDSCH.

Aspect 9 is the method of any of aspects 1 to 8, where the first DCI schedules the first PDSCH on the second CC and the second DCI schedules the second PDSCH on the second CC.

Aspect 10 is the method of any of aspects 1 to 9, where the first DCI is associated with a first control resource set (CORESET) pool index value and the second DCI is associated with a second CORESET pool index value.

Aspect 11 is the method of any of aspects 1 to 10, further including receiving a first medium access control (MAC) control element (MAC-CE) indicating the first set of TCI states and a second MAC-CE indicating the second set of TCI states.

Aspect 12 is the method of any of aspects 1 to 11, further including applying the QCL assumption based on at least one of the first time offset between the first DCI and the first PDSCH, the second time offset between the second DCI and the second PDSCH, and the QCL time duration.

Aspect 13 is an apparatus for wireless communication including means for implementing a method as in any of aspects 1 to 12.

Aspect 14 is an apparatus for wireless communication including at least one processor coupled to a memory and configured to implement a method as in any of aspects 1 to 12.

Aspect 15 is a computer-readable medium storing computer executable code, where the code when executed by a processor causes the processor to implement a method as in any of aspects 1 to 12.

Aspect 16 is a method of wireless communication at a transmit-receive point (TRP). The method includes transmitting, on a first component carrier (CC), first downlink control information (DCI) to a user equipment (UE), the first DCI indicating one of a first set of transmission configuration indication (TCI) states; and transmitting, on a second CC, a first physical downlink shared channel (PDSCH) to the UE, a first time offset being between the first DCI and the first PDSCH; where a quasi co-location (QCL) assumption is based on the first time offset between the first DCI and the first PDSCH and a QCL time duration.

Aspect 17 is the method of aspect 16, where the QCL assumption is equal to a default QCL assumption when the first time offset is less than the QCL time duration.

Aspect 18 is the method of any of aspects 16 to 17, where the default QCL assumption corresponds to a lowest TCI state of the first set of TCI states.

Aspect 19 is the method of any of aspects 16 to 18, where the QCL assumption corresponds to the one of the first set of TCI states indicated by the first DCI when the first time offset is greater than or equal to the QCL time duration.

Aspect 20 is the method of any of aspects 16 to 19, where a TCI state for the first PDSCH corresponds to the one of the first set of TCI states indicated by the first DCI.

Aspect 21 is the method of any of aspects 16 to 20, where the first time offset is equal to a difference between a receive time of the first DCI and a receive time of the first PDSCH.

Aspect 22 is the method of any of aspects 16 to 21, where the first DCI schedules the first PDSCH on the second CC.

Aspect 23 is the method of any of aspects 16 to 22, where the first DCI is associated with a first control resource set (CORESET) pool index value.

Aspect 24 is the method of any of aspects 16 to 23, further including transmitting a first medium access control (MAC) control element (MAC-CE) indicating the first set of TCI states.

Aspect 25 is an apparatus for wireless communication including means for implementing a method as in any of aspects 16 to 24.

Aspect 26 is an apparatus for wireless communication including at least one processor coupled to a memory and configured to implement a method as in any of aspects 16 to 24.

Aspect 27 is a computer-readable medium storing computer executable code, where the code when executed by a processor causes the processor to implement a method as in any of aspects 16 to 24.

What is claimed is:

1. An apparatus for wireless communication at a user equipment (UE), comprising:
   a memory; and
   at least one processor coupled to the memory and configured to:
   receive, on a first component carrier (CC), first downlink control information (DCI) from a first transmit-receive point (TRP) and second DCI from a second TRP, the first DCI indicating one of a first set of transmission configuration indication (TCI) states and the second DCI indicating one of a second set of TCI states;
   receive, on a second CC, a first physical downlink shared channel (PDSCH) from the first TRP and a second PDSCH from the second TRP, a first time offset being between the first DCI and the first PDSCH and a second time offset being between the second DCI and the second PDSCH; and
   determine a quasi co-location (QCL) assumption based on at least one of the first time offset between the first DCI and the first PDSCH, the second time offset between the second DCI and the second PDSCH, and a QCL time duration, wherein the QCL assumption is determined further based on a number of default beams supported by the UE if the first time offset is less than the QCL time duration and the second time offset is less than the QCL time duration.

2. The apparatus of claim 1, wherein the QCL assumption is equal to a default QCL assumption when the first time offset is less than the QCL time duration and the second time offset is less than the QCL time duration.

3. The apparatus of claim 2, wherein the default QCL assumption corresponds to a lowest TCI state of the first set of TCI states or the second set of TCI states.

4. The apparatus of claim 2, wherein the default QCL assumption corresponds to a lowest TCI state of the first set of TCI states and the second set of TCI states.

5. The apparatus of claim 1, wherein the QCL assumption corresponds to the one of the first set of TCI states indicated by the first DCI or the one of the second set of TCI states indicated by the second DCI when the first time offset is greater than or equal to the QCL time duration or the second time offset is greater than or equal to the QCL time duration.

6. The apparatus of claim 5, wherein a TCI state for the first PDSCH corresponds to the one of the first set of TCI states indicated by the first DCI and a TCI state for the second PDSCH corresponds to the one of the second set of TCI states indicated by the second DCI.

7. The apparatus of claim 1, wherein the at least one processor is further configured to:
   calculate the first time offset between the first DCI and the first PDSCH and the second time offset between the second DCI and the second PDSCH.

8. The apparatus of claim 1, wherein the first time offset is equal to a difference between a receive time of the first DCI and a receive time of the first PDSCH, wherein the second time offset is equal to a difference between a receive time of the second DCI and a receive time of the second PDSCH.

9. The apparatus of claim 1, wherein the first DCI schedules the first PDSCH on the second CC and the second DCI schedules the second PDSCH on the second CC.

10. The apparatus of claim 1, wherein the first DCI is associated with a first control resource set (CORESET) pool index value and the second DCI is associated with a second CORESET pool index value.

11. The apparatus of claim 1, wherein the at least one processor is further configured to:
receive a first medium access control (MAC) control element (MAC-CE) indicating the first set of TCI states and a second MAC-CE indicating the second set of TCI states.

12. The apparatus of claim 1, wherein the at least one processor is further configured to:
apply the QCL assumption based on at least one of the first time offset between the first DCI and the first PDSCH, the second time offset between the second DCI and the second PDSCH, and the QCL time duration.

13. A method of wireless communication at a user equipment (UE), comprising:
receiving, on a first component carrier (CC), first downlink control information (DCI) from a first transmit-receive point (TRP) and second DCI from a second TRP, the first DCI indicating one of a first set of transmission configuration indication (TCI) states and the second DCI indicating one of a second set of TCI states;
receiving, on a second CC, a first physical downlink shared channel (PDSCH) from the first TRP and a second PDSCH from the second TRP, a first time offset being between the first DCI and the first PDSCH and a second time offset being between the second DCI and the second PDSCH; and
determining a quasi co-location (QCL) assumption based on at least one of the first time offset between the first DCI and the first PDSCH, the second time offset between the second DCI and the second PDSCH, and a QCL time duration, wherein the QCL assumption is determined further based on a number of default beams supported by the UE if the first time offset is less than the QCL time duration and the second time offset is less than the QCL time duration.

14. The method of claim 13, wherein the QCL assumption is equal to a default QCL assumption when the first time offset is less than the QCL time duration and the second time offset is less than the QCL time duration.

15. The method of claim 14, wherein the default QCL assumption corresponds to a lowest TCI state of at least one of the first set of TCI states or the second set of TCI states.

16. The method of claim 13, wherein the QCL assumption corresponds to the one of the first set of TCI states indicated by the first DCI or the one of the second set of TCI states indicated by the second DCI when the first time offset is greater than or equal to the QCL time duration or the second time offset is greater than or equal to the QCL time duration, wherein a TCI state for the first PDSCH corresponds to the one of the first set of TCI states indicated by the first DCI and a TCI state for the second PDSCH corresponds to the one of the second set of TCI states indicated by the second DCI.

17. The method of claim 13, further comprising:
calculating the first time offset between the first DCI and the first PDSCH and the second time offset between the second DCI and the second PDSCH, wherein the first time offset is equal to a difference between a receive time of the first DCI and a receive time of the first PDSCH, wherein the second time offset is equal to a difference between a receive time of the second DCI and a receive time of the second PDSCH.

18. The method of claim 13, wherein the first DCI schedules the first PDSCH on the second CC and the second DCI schedules the second PDSCH on the second CC,
wherein the first DCI is associated with a first control resource set (CORESET) pool index value and the second DCI is associated with a second CORESET pool index value.

19. The method of claim 13, further comprising:
receiving a first medium access control (MAC) control element (MAC-CE) indicating the first set of TCI states and a second MAC-CE indicating the second set of TCI states.

20. The method of claim 13, further comprising:
applying the QCL assumption based on at least one of the first time offset between the first DCI and the first PDSCH, the second time offset between the second DCI and the second PDSCH, and the QCL time duration.

21. An apparatus for wireless communication at a transmit receive point network node, comprising:
a memory; and
at least one processor coupled to the memory and configured to:
transmit, on a first component carrier (CC), first downlink control information (DCI) via a first transmit-receive point (TRP) of the network node and second DCI vi a second TRP of the network node to a user equipment (UE), the first DCI indicating one of a first set of transmission configuration indication (TCI) states, the second DCI indicating one of a second set of TCI states; and
transmit, on a second CC, a first physical downlink shared channel (PDSCH) via the first TRP and a second PDSCH via the second TRP to the UE, a first time offset being between the first DCI and the first PDSCH, a second time offset being between the second DCI and the second PDSCH;
wherein a quasi co-location (QCL) assumption is based on at least one of the first time offset between the first DCI and the first PDSCH, the second time offset between the second DCI and the second PDSCH, and a QCL time duration, wherein the QCL assumption is further based on a number of default beams supported by the UE if the first time offset is less than the QCL time duration and the second time offset is less than the QCL time duration.

22. The apparatus of claim 21, wherein the QCL assumption is equal to a default QCL assumption when the first time offset is less than the QCL time duration and the second time offset is less than the QCL time duration.

23. The apparatus of claim 22, wherein the default QCL assumption corresponds to a lowest TCI state of the first set of TCI states or the second set of TCI states.

24. The apparatus of claim 21, wherein the QCL assumption corresponds to the one of the first set of TCI states indicated by the first DCI or the one of the second set of TCI states indicated by the second DCI when the first time offset is greater than or equal to the QCL time duration or the second time offset is greater than or equal to the QCL time duration.

25. The apparatus of claim 24, wherein a TCI state for the first PDSCH corresponds to the one of the first set of TCI states indicated by the first DCI and a TCI state for the second PDSCH corresponds to the one of the second set of TCI states indicated by the second DCI.

26. The apparatus of claim 21, wherein the first time offset is equal to a difference between a receive time of the first DCI and a receive time of the first PDSCH, and the second time offset is equal to a difference between a receive time of the second DCI and a receive time of the second PDSCH.

27. The apparatus of claim 21, wherein the first DCI schedules the first PDSCH on the second CC and the second DCI schedules the second PDSCH on the second CC.

28. The apparatus of claim 21, wherein the first DCI is associated with a first control resource set (CORESET) pool index value and the second DCI is associated with a second CORESET pool index value.

29. The apparatus of claim 21, wherein the at least one processor is further configured to:
   transmit a first medium access control (MAC) control element (MAC-CE) indicating the first set of TCI states and a second MAC-CE indicating the second set of TCI states.

30. A method of wireless communication at a network node, comprising:

transmitting, on a first component carrier (CC), first downlink control information (DCI) via a first transmit-receive point (TRP) of the network node and second DCI via a second TRP of the network node to a user equipment (UE), the first DCI indicating one of a first set of transmission configuration indication (TCI) states, the second DCI indicating one of a second set of TCI states; and transmitting, on a second CC, a first physical downlink shared channel (PDSCH) via the first TRP and a second PDSCH via the second TRP to the UE, a first time offset being between the first DCI and the first PDSCH, a second time offset being between the second DCI and the second PDSCH;

wherein a quasi co-location (QCL) assumption is based on at least one of the first time offset between the first DCI and the first PDSCH, the second time offset between the second DCI and the second PDSCH, and a QCL time duration, wherein the QCL assumption is further based on a number of default beams supported by the UE if the first time offset is less than the QCL time duration and the second time offset is less than the QCL time duration.

* * * * *